US008294916B2

(12) United States Patent
Kishimoto

(10) Patent No.: US 8,294,916 B2
(45) Date of Patent: Oct. 23, 2012

(54) APPARATUS, SYSTEM, MANAGEMENT METHOD, AND COMPUTER PROGRAM

(75) Inventor: Hiroaki Kishimoto, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1119 days.

(21) Appl. No.: 11/623,427

(22) Filed: Jan. 16, 2007

(65) Prior Publication Data
US 2007/0177186 A1    Aug. 2, 2007

(30) Foreign Application Priority Data
Jan. 27, 2006 (JP) .................. 2006-019509

(51) Int. Cl.
G06F 15/00    (2006.01)
(52) U.S. Cl. ................ 358/1.14; 358/1.13; 358/1.15
(58) Field of Classification Search ............. 358/1.14
See application file for complete search history.

(56) References Cited

U.S. PATENT DOCUMENTS
6,813,369 B2    11/2004 Oki
7,681,034 B1*    3/2010 Lee et al. ............... 713/164
2001/0026629 A1*    10/2001 Oki ........................... 382/100
2003/0182475 A1*    9/2003 Gimenez ....................... 710/8
2004/0080772 A1*    4/2004 Snyders .................... 358/1.14
2004/0165209 A1*    8/2004 Aoki et al. ............... 358/1.14
2004/0221234 A1    11/2004 Imai
2005/0100378 A1*    5/2005 Kimura et al. ............... 400/76
2005/0114684 A1*    5/2005 Ohno ......................... 713/187

FOREIGN PATENT DOCUMENTS
| JP | 2001-218011 A | 8/2001 |
| JP | 2004-110471 A | 4/2004 |
| JP | 2004-355610 A | 12/2004 |
| JP | 2005-004415 A | 1/2005 |
| JP | 2005-135017 A | 5/2005 |
| JP | 2005-149406 A | 6/2005 |
| JP | 2005-202888 A | 7/2005 |

* cited by examiner

Primary Examiner — Marivelisse Santiago Cordero
Assistant Examiner — Kent Yip
(74) Attorney, Agent, or Firm — Canon USA Inc. IP Division

(57) ABSTRACT

An apparatus changes setting for inhibiting processing of an electronic document executed in a document processing apparatus to setting for permitting the processing of the electronic document. After the setting for permitting the processing of the electronic document, upon reception of information indicating that the electronic document has been processed, the apparatus changes the setting for permitting the processing of the electronic document to setting for inhibiting the processing of the electronic document.

17 Claims, 17 Drawing Sheets

FIG.3

LIST OF SUZUKI'S ELECTRONIC DOCUMENTS

| DOCUMENT ID | DOCUMENT NAME | DISTRIBUTION DESTINATION | EDIT/ REFERENCE ▼ | PERMISSION OF PRINTING ▼ | STATE OF DOCUMENT |
|---|---|---|---|---|---|
| 00000001 | CONFERENCE DATA 1.pdf | Yamada | REFERENCE ONLY | PRINTING INHIBITED | SAVED |
| 00000003 | BUSINESS RESULT NOV..xls | Sato | REFERENCE | PRINTING INHIBITED | BEING READ |
| 00000004 | EDUCATION PLAN.doc | Yamada | EDIT/ REFERENCE | PRINTING INHIBITED | BEING EDITED |
| 00000005 | CONFERENCE MINUTES NOV. 1.doc | Yamada | EDIT/ REFERENCE | PRINTING INHIBITED | SAVED |
| 00000101 | ○X COMPANY ESTIMATE.pdf | Ohta | EDIT/ REFERENCE | PRINTING INHIBITED | SAVED |
| 00000219 | □△INDUSTRY BILL.pdf | Ohta | EDIT/ REFERENCE | PRINTING INHIBITED | SAVED |
| 00000288 | TECHNICAL DATA 1.doc | Kawai | EDIT/ REFERENCE | PRINTING INHIBITED | SAVED |
| 00000342 | REFERENCE DATA 1.doc | Kawai | EDIT/ REFERENCE | PRINTING INHIBITED | BEING EDITED |

FIG.4

LIST OF SUZUKI'S ELECTRONIC DOCUMENTS 400

| DOCUMENT ID | DOCUMENT NAME | DISTRIBUTION DESTINATION | EDIT/ REFERENCE ▼ | PERMISSION OF PRINTING ▼ | STATE OF DOCUMENT |
|---|---|---|---|---|---|
| 00000001 | CONFERENCE DATA 1.pdf | Yamada | REFERENCE ONLY | PRINTING PERMITTED | SAVED |
| 00000003 | BUSINESS RESULT NOV..xls | Sato | REFERENCE ONLY | PRINTING INHIBITED | BEING READ |
| 00000004 | EDUCATION PLAN.doc | Yamada | EDIT/ REFERENCE | PRINTING INHIBITED | BEING EDITED |
| 00000005 | CONFERENCE MINUTES NOV. 1.doc | Yamada | EDIT/ REFERENCE | PRINTING INHIBITED | SAVED |
| 00000101 | ○× COMPANY ESTIMATE.pdf | Ohta | EDIT/ REFERENCE | PRINTING INHIBITED | SAVED |
| 00000219 | □△ INDUSTRY BILL.pdf | Ohta | EDIT/ REFERENCE | PRINTING INHIBITED | SAVED |
| 00000288 | TECHNICAL DATA 1.doc | Kawai | EDIT/ REFERENCE | PRINTING INHIBITED | SAVED |
| 00000342 | REFERENCE DATA 1.doc | Kawai | EDIT/ REFERENCE | PRINTING INHIBITED | BEING EDITED |

FIG.6

LIST OF SUZUKI'S ELECTRONIC DOCUMENTS

| DOCUMENT ID | DOCUMENT NAME | DISTRIBUTION DESTINATION | EDIT/ REFERENCE ▼ | PERMISSION OF PRINTING ▼ | STATE OF DOCUMENT |
|---|---|---|---|---|---|
| 00000001 | CONFERENCE DATA 1.pdf | Yamada | REFERENCE ONLY | PRINTING PERMITTED | BEING PRINTED (PRINTER A) |
| 00000003 | BUSINESS RESULT NOV..xls | Sato | REFERENCE ONLY | PRINTING INHIBITED | BEING READ |
| 00000004 | EDUCATION PLAN.doc | Yamada | EDIT/ REFERENCE | PRINTING INHIBITED | BEING EDITED |
| 00000005 | CONFERENCE MINUTES NOV. 1.doc | Yamada | EDIT/ REFERENCE | PRINTING INHIBITED | SAVED |
| 00000101 | ○× COMPANY ESTIMATE.pdf | Ohta | EDIT/ REFERENCE | PRINTING INHIBITED | SAVED |
| 00000219 | □△ INDUSTRY BILL.pdf | Ohta | EDIT/ REFERENCE | PRINTING INHIBITED | SAVED |
| 00000288 | TECHNICAL DATA 1.doc | Kawai | EDIT/ REFERENCE | PRINTING INHIBITED | SAVED |
| 00000342 | REFERENCE DATA 1.doc | Kawai | EDIT/ REFERENCE | PRINTING INHIBITED | BEING EDITED |

FIG.9

LIST OF SUZUKI'S ELECTRONIC DOCUMENTS 900

| DOCUMENT ID 301 | DOCUMENT NAME 302 | DISTRIBUTION DESTINATION 303 | EDIT/ REFERENCE ▶ 304 | PERMISSION OF PRINTING ▶ 305 | STATE OF DOCUMENT 306 601 |
|---|---|---|---|---|---|
| | | | | 401 | PRINTING ABNORMALITY (PRINTER A) |
| 00000001 | CONFERENCE DATA 1.pdf | Yamada | REFERENCE ONLY | PRINTING PERMITTED | BEING READ |
| 00000003 | BUSINESS RESULT NOV..xls | Sato | REFERENCE ONLY | PRINTING INHIBITED | BEING EDITED |
| 00000004 | EDUCATION PLAN.doc | Yamada | EDIT/ REFERENCE | PRINTING INHIBITED | SAVED |
| 00000005 | CONFERENCE MINUTES NOV. 1.doc | Yamada | EDIT/ REFERENCE | PRINTING INHIBITED | SAVED |
| 00000101 | ○X COMPANY ESTIMATE.pdf | Ohta | EDIT/ REFERENCE | PRINTING INHIBITED | SAVED |
| 00000219 | □△ INDUSTRY BILL.pdf | Ohta | EDIT/ REFERENCE | PRINTING INHIBITED | SAVED |
| 00000288 | TECHNICAL DATA 1.doc | Kawai | EDIT/ REFERENCE | PRINTING INHIBITED | SAVED |
| 00000342 | REFERENCE DATA 1.doc | Kawai | EDIT/ REFERENCE | PRINTING INHIBITED | BEING EDITED |

FIG.10

LIST OF SUZUKI'S ELECTRONIC DOCUMENTS — 1000

| DOCUMENT ID (301) | DOCUMENT NAME (302) | DISTRIBUTION DESTINATION (303) | EDIT/ REFERENCE ▼ (304) | PERMISSION OF PRINTING ▼ (305) | NUMBER OF TIMES OF PRINTING (1001) | STATE OF DOCUMENT (306) |
|---|---|---|---|---|---|---|
| 00000001 | CONFERENCE DATA 1.pdf | Yamada | REFERENCE ONLY | PRINTING PERMITTED | 2 | SAVED |
| 00000003 | BUSINESS RESULT NOV..xls | Sato | REFERENCE REFERENCE | PRINTING INHIBITED | 0 | BEING READ |
| 00000004 | EDUCATION PLAN.doc | Yamada | EDIT/ REFERENCE | PRINTING INHIBITED | 0 | BEING EDITED |
| 00000005 | CONFERENCE MINUTES NOV. 1.doc | Yamada | EDIT/ REFERENCE | PRINTING INHIBITED | 0 | SAVED |
| 00000101 | ○× COMPANY ESTIMATE.pdf | Ohta | EDIT/ REFERENCE | PRINTING INHIBITED | 0 | SAVED |
| 00000219 | □△ INDUSTRY BILL.pdf | Ohta | EDIT/ REFERENCE | PRINTING INHIBITED | 0 | SAVED |
| 00000288 | TECHNICAL DATA 1.doc | Kawai | EDIT/ REFERENCE | PRINTING INHIBITED | 0 | SAVED |
| 00000342 | REFERENCE DATA 1.doc | Kawai | EDIT/ REFERENCE | PRINTING INHIBITED | 0 | BEING EDITED |

FIG.11

LIST OF SUZUKI'S ELECTRONIC DOCUMENTS — 1100

| DOCUMENT ID | DOCUMENT NAME | DISTRIBUTION DESTINATION | EDIT/ REFERENCE ▼ | PERMISSION OF PRINTING ▼ | NUMBER OF TIMES OF PRINTING | STATE OF DOCUMENT |
|---|---|---|---|---|---|---|
| 00000001 | CONFERENCE DATA 1.pdf | Yamada | REFERENCE ONLY | PRINTING PERMITTED | 2 | BEING PRINTED (PRINTER A) |
| 00000003 | BUSINESS RESULT NOV..xls | Sato | REFERENCE ONLY | PRINTING INHIBITED | 0 | BEING READ |
| 00000004 | EDUCATION PLAN.doc | Yamada | EDIT/ REFERENCE | PRINTING INHIBITED | 0 | BEING EDITED |
| 00000005 | CONFERENCE MINUTES NOV. 1.doc | Yamada | EDIT/ REFERENCE | PRINTING INHIBITED | 0 | SAVED |
| 00000101 | ○× COMPANY ESTIMATE.pdf | Ohta | EDIT/ REFERENCE | PRINTING INHIBITED | 0 | SAVED |
| 00000219 | □△ INDUSTRY BILL.pdf | Ohta | EDIT/ REFERENCE | PRINTING INHIBITED | 0 | SAVED |
| 00000288 | TECHNICAL DATA 1.doc | Kawai | EDIT/ REFERENCE | PRINTING INHIBITED | 0 | SAVED |
| 00000342 | REFERENCE DATA 1.doc | Kawai | EDIT/ REFERENCE | PRINTING INHIBITED | 0 | BEING EDITED |

FIG.13

LIST OF SUZUKI'S ELECTRONIC DOCUMENTS 1300

| DOCUMENT ID 301 | DOCUMENT NAME 302 | DISTRIBUTION DESTINATION 303 | EDIT/ REFERENCE 304 | PERMISSION OF PRINTING 305 | NUMBER OF TIMES OF PRINTING 1001 1301 | STATE OF DOCUMENT 306 1101 |
|---|---|---|---|---|---|---|
| 00000001 | CONFERENCE DATA 1.pdf | Yamada | REFERENCE ONLY | PRINTING PERMITTED | 1 | SAVED |
| 00000003 | BUSINESS RESULT NOV..xls | Sato | EDIT/ REFERENCE | PRINTING INHIBITED | 0 | BEING READ |
| 00000004 | EDUCATION PLAN.doc | Yamada | EDIT/ REFERENCE | PRINTING INHIBITED | 0 | BEING EDITED |
| 00000005 | CONFERENCE MINUTES NOV. 1.doc | Yamada | EDIT/ REFERENCE | PRINTING INHIBITED | 0 | SAVED |
| 00000101 | ○× COMPANY ESTIMATE.pdf | Ohta | EDIT/ REFERENCE | PRINTING INHIBITED | 0 | SAVED |
| 00000219 | □△INDUSTRY BILL.pdf | Ohta | EDIT/ REFERENCE | PRINTING INHIBITED | 0 | SAVED |
| 00000288 | TECHNICAL DATA 1.doc | Kawai | EDIT/ REFERENCE | PRINTING INHIBITED | 0 | SAVED |
| 00000342 | REFERENCE DATA 1.doc | Kawai | EDIT/ REFERENCE | PRINTING INHIBITED | 0 | BEING EDITED |

FIG.15

LIST OF SUZUKI'S ELECTRONIC DOCUMENTS 1500

| DOCUMENT ID 301 | DOCUMENT NAME 302 | DISTRIBUTION DESTINATION 303 | EDIT/ REFERENCE 304 | PERMISSION OF PRINTING 305 1501 | NUMBER OF TIMES OF PRINTING 1001 1301 | STATE OF DOCUMENT 306 1101 |
|---|---|---|---|---|---|---|
| 00000001 | CONFERENCE DATA 1.pdf | Yamada | REFERENCE ONLY | PRINTING INHIBITED | 0 | SAVED |
| 00000003 | BUSINESS RESULT NOV...xls | Sato | REFERENCE ONLY | PRINTING INHIBITED | 0 | BEING READ |
| 00000004 | EDUCATION PLAN.doc | Yamada | EDIT/ REFERENCE | PRINTING INHIBITED | 0 | BEING EDITED |
| 00000005 | CONFERENCE MINUTES NOV. 1.doc | Yamada | EDIT/ REFERENCE | PRINTING INHIBITED | 0 | SAVED |
| 00000101 | ○× COMPANY ESTIMATE.pdf | Ohta | EDIT/ REFERENCE | PRINTING INHIBITED | 0 | SAVED |
| 00000219 | □△ INDUSTRY BILL.pdf | Ohta | EDIT/ REFERENCE | PRINTING INHIBITED | 0 | SAVED |
| 00000288 | TECHNICAL DATA 1.doc | Kawai | EDIT/ REFERENCE | PRINTING INHIBITED | 0 | SAVED |
| 00000342 | REFERENCE DATA 1.doc | Kawai | EDIT/ REFERENCE | PRINTING INHIBITED | 0 | BEING EDITED |

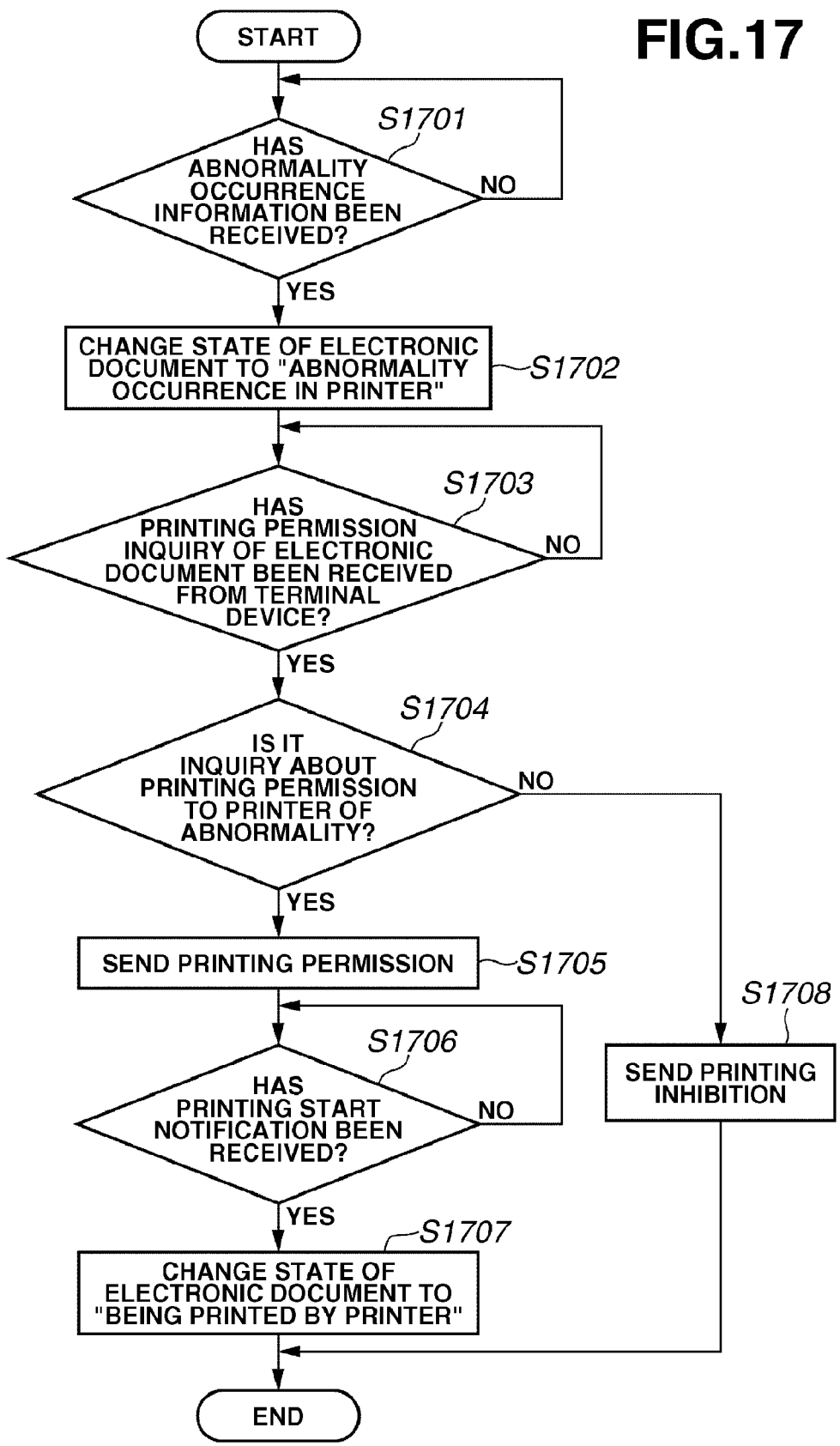

APPARATUS, SYSTEM, MANAGEMENT METHOD, AND COMPUTER PROGRAM

BACKGROUND OF THE INVENTION

1. Field of the Invention

The present invention relates to an apparatus, a system, a management method, and a computer program that are suitably used particularly for managing processing of electronic documents.

2. Description of the Related Art

There has conventionally been available a system designed to limit processing of electronic documents (see Japanese Patent Application Laid-Open No. 2004-355610). Such a system can distribute electronic documents to users under certain restrictions. Specifically, a manager of electronic documents (e.g., creator or owner of electronic documents) can allow the users to read the distributed electronic documents while inhibiting printing of the distributed electronic documents by printers or editing of the distributed electronic documents by terminal apparatuses. Thus, according to the conventional technology, a manager of electronic documents can define settings as to who will get what authority regarding electronic documents.

However, when a need arises to change contents of the setting as to authority about electronic documents, according to the conventional technology, the manager has to change the setting as occasion demands. For example, when there is a need to temporarily allow a certain user to print an electronic document for some reason, the manager has to first change contents of the setting from inhibition of printing of the electronic document to temporary permission of printing of the electronic document. Then, upon completion of printing of the electronic document, the manager returns the setting to inhibition of printing of the electronic document.

As described above, according to the conventional technology, the change of setting as to the authority about electronic documents is always made by the manager of the electronic documents. When the setting is changed to permit printing of the electronic document and is then returned to original contents as in the aforementioned example, the manager of the electronic document must check completion of printing of the electronic document before returning the setting to the original contents. In this case, to check the completion of printing of the electronic document, the manager of the electronic document has to wait for a report of the completion of printing of the electronic document from the user himself. Such report transfer is cumbersome for both of the electronic document manager and the user, thus causing a great reduction in usability of the system.

Thus, according to the conventional technology, to manage an authority about electronic documents, great time and labor may be imposed on the electronic document manager or the user.

SUMMARY OF THE INVENTION

An embodiment of the present invention is directed to reducing time and labor that may be imposed on a manager or a user of electronic documents.

According to an aspect of the present invention, an embodiment is directed to an apparatus including a first setting change unit configured to change from a first setting for inhibiting processing of an electronic document by a document processing apparatus to a second setting for permitting the processing of the electronic document by the document processing apparatus, a reception unit configured to receive, from the document processing apparatus, information indicating that the electronic document has been processed after the second setting for permitting the processing of the electronic document is applied to the electronic document, a second setting change unit configured to change from the second setting for permitting the processing of the electronic document to the first setting for inhibiting the processing of the electronic document in response to the reception unit receiving the information indicating that the electronic document has been processed by the document processing apparatus, and a transmission unit configured to transmit information indicating inhibition or permission of the processing of the electronic document based on whether the first setting for inhibiting the processing of the electronic document or the second setting for permitting the processing of the electronic document applies to the electronic document.

According to another aspect of the present invention, an embodiment is directed a system that includes an apparatus (e.g., electronic document management server), a document processing apparatus (e.g., printer), and a terminal apparatus (e.g., client device). In the system, the apparatus includes a first setting change unit configured to change from a first setting for inhibiting processing of an electronic document by the document processing apparatus to a second setting for permitting the processing of the electronic document by the document processing apparatus, a first reception unit configured to receive, from the document processing apparatus, information indicating that the electronic document has been processed after the second setting for permitting the processing of the electronic document is applied to the electronic document, a second setting change unit configured to change from the second setting for permitting the processing of the electronic document to the first setting for inhibiting the processing of the electronic document in response to the first reception unit receiving the information indicating that the electronic document has been processed by the document processing apparatus, and a first transmission unit configured to transmit, to the terminal apparatus, information indicating inhibition or permission of the processing of the electronic document based on whether the first setting for inhibiting the processing of the electronic document or the second setting for permitting the processing of the electronic document applies to the electronic document. The terminal apparatus includes a second reception unit configured to receive the information indicating inhibition or permission of the processing of the electronic document, and a second transmission unit configured to transmit the electronic document to the document processing apparatus when the information indicating permission of the processing of the electronic document is received by the second reception unit.

According to yet another aspect of the present invention, an embodiment is directed to a system that includes an apparatus (e.g., electronic document management server), a document processing apparatus (e.g., printer), and a terminal apparatus (e.g., client device). In the system, the apparatus includes a first setting change unit configured to change from a first setting for inhibiting processing of an electronic document by the document processing apparatus to a second setting for permitting the processing of the electronic document by the document processing apparatus, wherein the electronic document is transmitted from the terminal apparatus to the document processing apparatus, a first reception unit configured to receive, from the document processing apparatus, information indicating that the electronic document has been processed after the second setting for permitting the processing of the electronic document is applied to the electronic document, a second setting change unit configured to change from the second setting for permitting the processing of the electronic document to the first setting for inhibiting the processing of the electronic document in response to the first reception unit receiving the information indicating that the electronic document has been processed by the document processing apparatus, and a first transmission unit configured to transmit, to the document processing apparatus, information indicating inhibition or permission of the processing of the electronic document based on whether the first setting for inhibiting the processing of the electronic document or the second setting for permitting the processing of the electronic document applies to the electronic document. The terminal apparatus includes a second transmission unit configured to transmit the electronic document to the document processing apparatus. The document processing apparatus includes a second reception unit configured to receive the electronic document transmitted from the terminal apparatus, a third reception unit configured to receive the information indicating inhibition or permission of the processing of the electronic document, and a processing unit configured to process the electronic document received by the second reception unit when the information indicating permission of the processing of the electronic document is received by the third reception unit.

According to still yet another aspect of the present invention, an embodiment is directed a method for managing setting for inhibiting or permitting processing of an electronic document by a document processing apparatus. The method includes changing from a first setting for inhibiting processing of the electronic document by the document processing apparatus to a second setting for permitting the processing of the electronic document by the document processing apparatus, receiving, from the document processing apparatus, information indicating that the electronic document has been processed after the second setting for permitting the processing of the electronic document is applied to the electronic document, changing from the second setting for permitting the processing of the electronic document to the first setting for inhibiting the processing of the electronic document in response to receiving the information indicating that the electronic document has been processed by the document processing apparatus, and transmitting information indicating inhibition or permission of the processing of the electronic document based on whether the first setting for inhibiting the processing of the electronic document or the second setting for permitting the processing of the electronic document applies to the electronic document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram showing an example of a document authority setting screen displayed by a display disposed in the electronic document management server according to the first exemplary embodiment of the present invention.

FIG. 4 is a diagram showing an example of a document authority setting screen displayed when setting of an authority about an electronic document is changed according to the first exemplary embodiment of the present invention.

FIG. 6 is a diagram showing an example of a document authority setting screen displayed when the electronic document management server receives a print data transmission completion notification according to the first exemplary embodiment of the present invention.

FIG. 9 is a diagram showing an example of a document authority setting screen displayed when the electronic document management server receives abnormality occurrence information according to the first exemplary embodiment of the present invention.

FIG. 10 is a diagram showing an example of a document authority setting screen displayed by a display disposed in an electronic document management server according to a second exemplary embodiment of the present invention.

FIG. 11 is a diagram showing a document authority setting screen displayed when the electronic document management server receives a print data transmission completion notification according to the second exemplary embodiment of the present invention.

FIG. 13 is a diagram showing an example of a document authority setting screen displayed when printing of an electronic document is completed according to the second exemplary embodiment of the present invention.

FIG. 15 is a diagram showing an example of a document authority setting screen displayed when the number of times of printing an electronic document reaches 0 according to the second exemplary embodiment of the present invention.

FIG. 17 is a flowchart showing an example of processing performed by an electronic document management server when an abnormality occurs in a printer during printing according to the third exemplary embodiment of the present invention.

DETAILED DESCRIPTION OF THE EMBODIMENTS

Various exemplary embodiments, features, and aspects of the present invention will be described in detail below with reference to the drawings.

First Exemplary Embodiment

Figure 1:
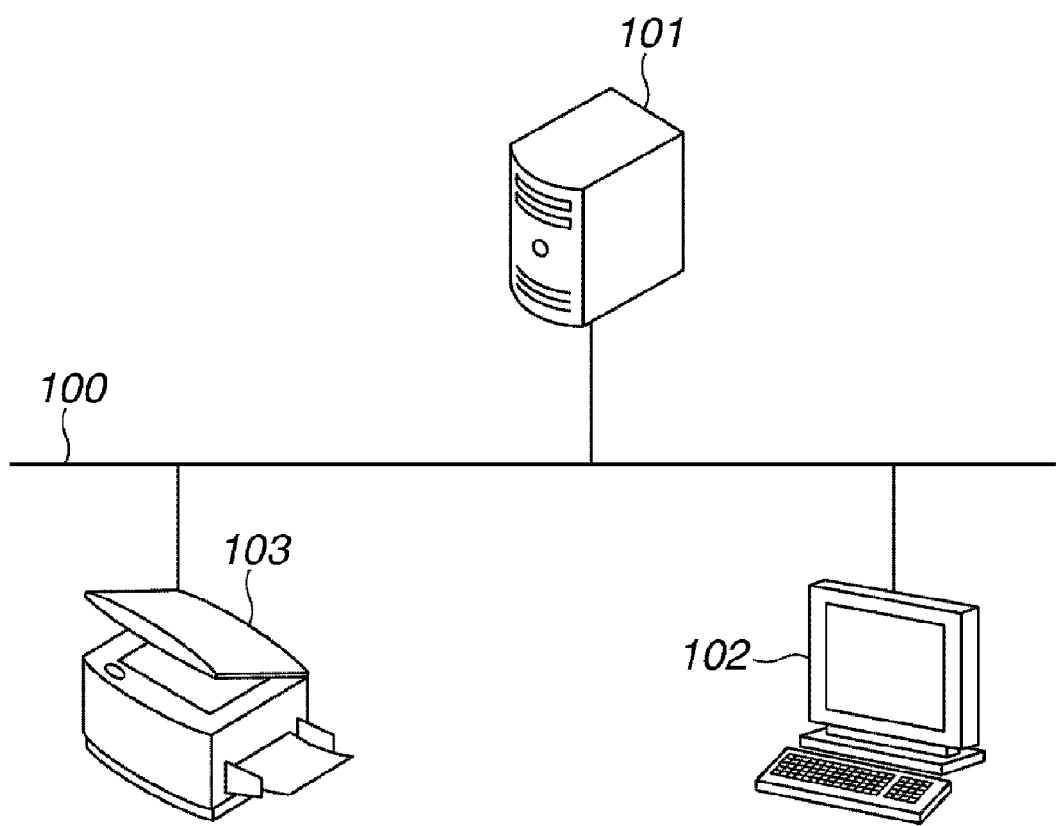
FIG. 1 is a diagram showing an exemplary configuration of an electronic document management system according to a first exemplary embodiment of the present invention.

FIG. 1 is a diagram showing an exemplary configuration of an electronic document management system according to a first exemplary embodiment of the present invention.

In FIG. 1, the electronic document management system includes an electronic document management server 101, a terminal 102, a printer 103, and a network 100. The electronic document management server 101, the terminal 102, and the printer 103 are interconnected to communicate with one another via the network 100. FIG. 1 shows an example in which the numbers of electronic document management servers 101, terminals 102 and printers 103 are respectively one. However, there is no limitation on the numbers of electronic document management servers 101, terminals 102, and printers 103. Here, a printer will be described as an exemplary document processing apparatus for processing electronic documents.

Figure 2:
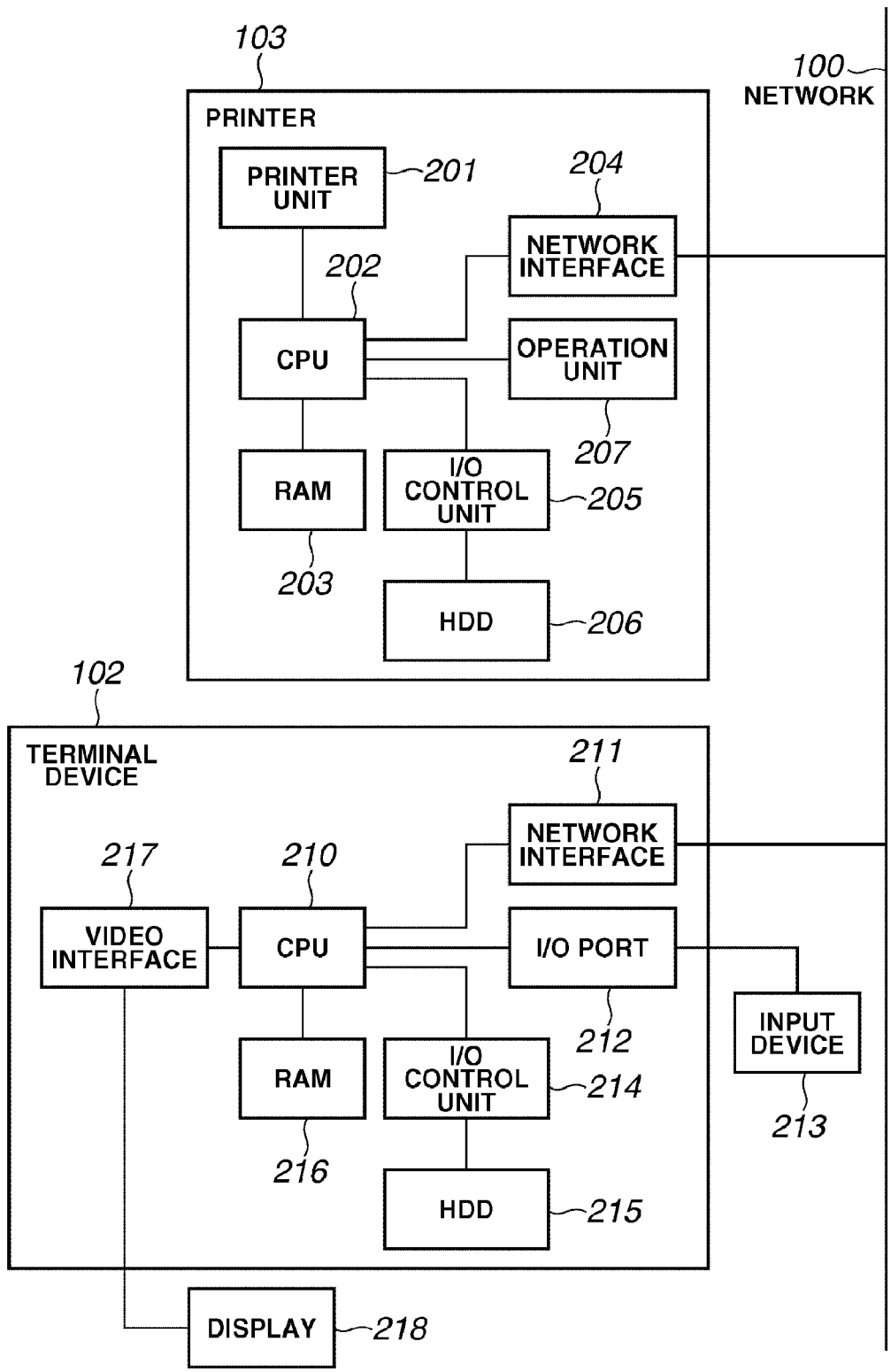
FIG. 2 is a block diagram showing an exemplary internal configuration of a printer and a terminal according to the first exemplary embodiment of the present invention.

FIG. 2 is a block diagram showing an example of an internal configuration of the printer 103 and the terminal 102.

In FIG. 2, a central processing unit (CPU) 202 disposed in the printer 103 is connected to a printer unit 201, a RAM 203, a network interface 204, an I/O control unit 205, and an operation unit 207 via a bus. A hard disk drive (HDD) 206 is connected to the I/O control unit 205.

The CPU 202 reads a program stored in the HDD 206 connected via the I/O control unit 205. The CPU 202 loads and executes the read program on the RAM 203 to control the printer unit 201 or the like which includes a printer engine to execute a print job sent from the terminal 102 or printing based on the print job. The CPU 202 is connected to the network 100 via the network interface 204 so that the CPU 202 can communicate with the electronic document management server 101 and the terminal 102 connected to the network 100. Additionally, for example, the CPU 202 receives an operation on the operation unit 207 equipped with a user interface such as a button or a touch panel.

A central processing unit (CPU) 210 disposed in the terminal 102 is connected to a network interface 211, an I/O port 21, an I/O control unit 214, a RAM 216, and a video interface 217 via a bus. A hard disk drive (HDD) 215 is connected to the I/O control unit 214.

For example, an input device 213 equipped with a keyboard or a mouse, or an external apparatus (not shown) can be connected to the I/O port 212. A display 218 can be connected to the video interface 217.

The CPU 210 reads a program stored in the HDD 215 connected via the I/O control unit 214 to load the program on the RAM 216, and executes the program loaded on the RAM 216. The CPU 210 is connected to the network 100 via the network interface 211 so that the CPU 210 can communicate with the electronic document management server 101 and the printer 103 connected to the network 100. Additionally, the CPU 210 receives an operation on the input device 213 via the I/O port 212.

The HDD 215 disposed in the terminal 102 stores a printer driver for transmitting print data of an electronic document to the printer 103. Upon execution of a program of the printer driver or the like, the CPU 210 can communicate with the electronic document management server 101 and the printer 103 via the network interface 211.

The HDD 215 stores an application program for executing reading, editing, and printing electronic documents. The CPU 210 reads and executes the application program to display a graphic user interface (GUI) in the display 218 based on the application program. The user operates the GUI displayed in the display 218 by using the input device 213 so that the user can instruct reading, editing, and printing of an electronic document.

When the user instructs printing, the application program executes processing for using the printer driver to generate print data, and transmitting a print job containing the generated print data to the printer 103 via the network 100. In this case, the CPU 210 transmits the print job to the printer 103 with a communication protocol for file transmission. As the communication protocol for file transmission, File Transfer Protocol (FTP) or Hyper Text Transfer Protocol (HTTP) is available.

According to the present exemplary embodiment, as a hardware configuration of the electronic document management server 101 is similar to that of the terminal 102 shown in FIG. 2, a drawing of the electronic document management server 101 is omitted. In the description below, for the hardware configuration of the electronic document management server 101, reference numerals 210 to 218 assigned to the terminal 102 shown in FIG. 2 will be used.

FIG. 3 shows an example of a document authority setting screen 300 displayed in the display 218 disposed in the electronic document management server 101 according to the present exemplary embodiment. The document authority setting screen 300 is displayed in the display 218 by executing an electronic document management application stored on the HDD 215 disposed in the electronic document management server 101. For example, contents of the document authority setting screen 300 are stored on the HDD 215 disposed in the electronic document management server 101.

To simplify explanation, in the document authority setting screen 300 shown in FIG. 3, a document ID, a document name 302, a distribution destination 303, and a state of document 306 can be referred to for each electronic document. Permission 304 of edit/reference of an electronic document, and permission of printing 305 can be set for each electronic document.

In the document authority setting screen 300, a list of documents managed by a manager 301 displayed at a left upper corner is displayed. The manager 301 can execute setting for permitting/inhibiting a user who is a distribution destination of an electronic document to make an editing, referencing or printing instruction with respect to an electronic document displayed in the document authority setting screen 300.

Items other than management items 302 to 306 displayed in the document authority setting screen 300 shown in FIG. 3 may be set or referred to in the document authority setting screen 300.

FIG. 4 shows an example of a document authority setting screen 400 displayed when contents of an authority about an electronic document are changed in the document authority setting screen 300 shown in FIG. 3. Specifically, FIG. 4 shows an example of a document authority setting screen 400 displayed when contents of permission of printing 305 of the electronic document of a document name 302 of "CONFER- ENCE DATA 1" are changed from "printing inhibited" to "printing permitted". The manager of the electronic documents can change contents of the document authority setting screen 300 by operating the input device 213 disposed in the electronic document management server 101.

When contents of a section 401 of the permission of printing 305 are changed as in the case of the document authority setting screen 400 shown in FIG. 4, it means that the manager 301 of the electronic documents permits a user named "Yamada" to print the electronic document of a document name 302 of "CONFERENCE DATA 1".

Figure 5:
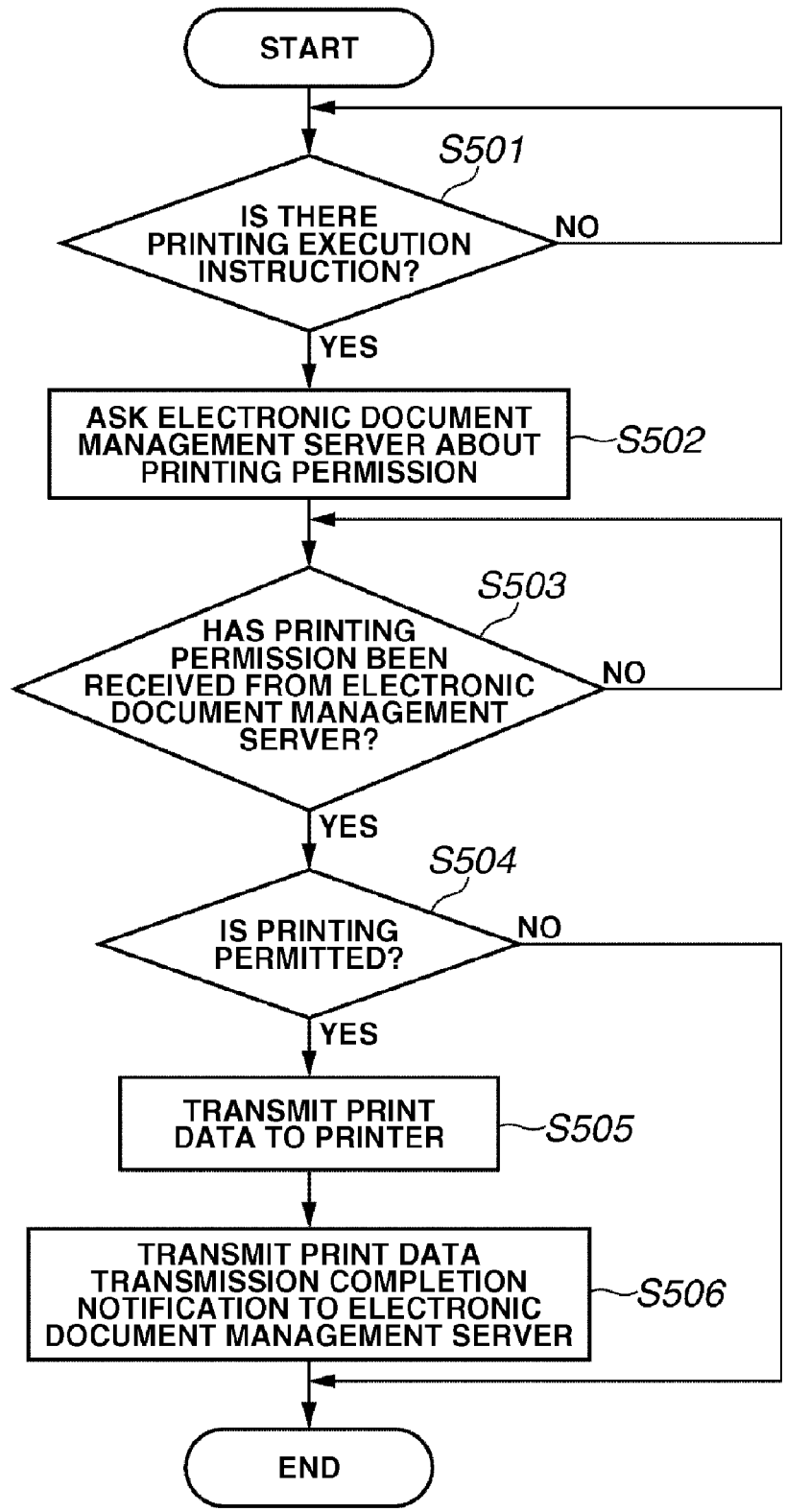
FIG. 5 is a flowchart showing an example of processing performed by a terminal apparatus from reception of a printing execution instruction to transmission of print data to a printer according to the first exemplary embodiment of the present invention.

Next, referring to the flowchart of FIG. 5, an example of processing performed by the terminal 102 from reception of a printing execution instruction to transmission of print data to the printer 103 will be described. The processing in the flowchart of FIG. 5 is realized when the CPU 210 of the terminal 102 executes an application program and a printer driver stored in the HDD 215.

First, the terminal 102 determines whether there is a printing execution instruction (step S501). The terminal 102 stands by until the user makes a printing execution instruction by using the input device 213 disposed in the terminal 102. Upon reception of the printing execution instruction, the terminal 102 asks the electronic document management server 101 about permission of printing of an electronic document instructed to be subjected to printing execution (step S502). For example, this inquiry is realized by transmitting user's identification information, identification information of the electronic document instructed to be subjected to printing execution (document ID), and identification information of the printer 103 which becomes a transmission destination of print data of the electronic document to the electronic document management server 101.

The electronic document management server 101 specifies a distribution destination 303 and a document name 302 of the document authority setting screen 400 based on the user's identification information and the document ID of the electronic document transmitted from the terminal 102 in step S502. The electronic authority setting management server 101 determines that the inquiry is a printing permission inquiry because the identification information of the printer 103 has been transmitted from the terminal 102. Accordingly, the electronic document management server 101 reads contents set in the section of the permission of printing 305 corresponding to the specified distribution destination 303 and document name 302. Then, the electronic document management server 101 sends the read contents (information indicating permission/inhibition of printing) to the terminal 102 which has made the inquiry.

For example, when identification information of a user is "Yamada", and a document ID of the electronic document instructed to be printed is "00000001" in the document authority setting screen 400 shown in FIG. 4, "PRINTING PERMITTED" is set in the section 401 of the permission of printing 305. Accordingly, the electronic document management server 101 sends information indicating printing permission to the terminal 102 which has made the inquiry.

The terminal 102 thus determines reception of information indicating printing permission sent from the electronic document management server 101 (step S503). Then, based on the received information, the terminal 102 determines whether the electronic document instructed to be printed is permitted to be printed (step S504). If a result of the determination shows that the electronic documents instructed to be printed is permitted to be printed, the terminal 102 generates print data of the electronic document instructed to be printed, and transmits a print job containing the generated print data to the printer 103 (step S505).

Next, the terminal 102 transmits a transmission completion notification of the print data indicating transmission completion of the print data to the printer 103 to the electronic document management server 101 (step S506) to terminate the processing.

On the other hand, if the electronic document instructed to be printed is inhibited from being printed, the terminal 102 cancels the printing processing (omitting steps S505 and S506) to terminate the processing.

The CPU 102 of the printer 103 that has received the print job transmitted from the terminal 102 in step S505 causes the printer unit 201 to execute printing based on the print data contained in the print job. When the printing is completed, the CPU 202 of the printer 103 transmits a printing completion notification to the electronic document management server 101.

FIG. 6 shows an example of a document authority setting screen 600 displayed when the electronic document management server 101 receives the transmission completion notification of the print data transmitted from the terminal 102 in step S506 shown in FIG. 5. In the example of the document authority setting screen 600 shown in FIG. 6, with a printing execution instruction from a user named "Yamada", an electronic document of a document ID "00000001" is transmitted to a printer 103 named "PRINTER A". In other words, a section 601 of the state of document 306 is changed from "SAVED" of FIG. 4 to "BEING PRINTED (PRINTER A)" of FIG. 6. Accordingly, a state of the electronic document of the document ID "00000001" is set to "being printed at the printer 103".

Figure 7:
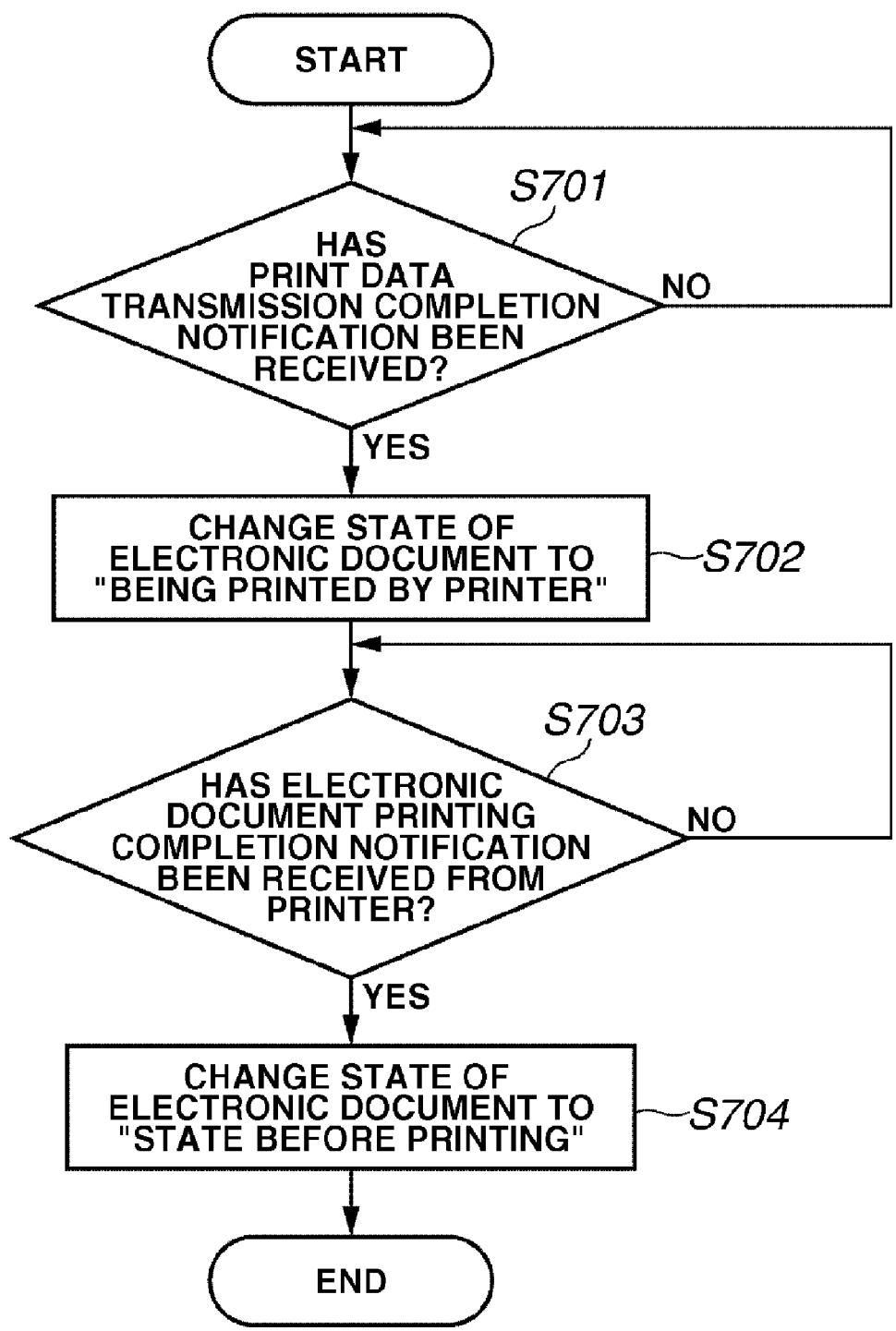
FIG. 7 is a flowchart showing an example of processing performed by the electronic document management server when the print data transmission completion notification is transmitted according to the first exemplary embodiment of the present invention.

Next, referring to FIG. 7, an example of processing performed by the electronic document management server 101 when the transmission completion notification of the print data is transmitted from the terminal 102 in step S506 of FIG. 5 will be described. The processing in the flowchart of FIG. 7 is realized when the CPU 210 of the electronic document management server 101 executes the electronic document management application or the like stored in the HDD 215.

First, to stand by until reception of a transmission completion notification of print data, the electronic document management server 101 determines whether the transmission completion notification of the print data has been received (step S701). Upon reception of the transmission completion notification of the print data, as shown in FIG. 6, the electronic document management server 101 changes contents of a relevant section of the state of document 306 of the document authority setting screen 600 to "being printed at the printer 103" (step S702).

Next, to stand by until reception of a printing completion notification transmitted from the printer 103, the electronic document management server 101 determines whether the printing completion notification has been received (step S703). Upon reception of the printing completion notification, the electronic document management server 101 changes contents of the section 601 of the state of document 306 to a state before printing, i.e., contents shown in FIG. 4 (step S704). Additionally, the electronic document management server 101 changes contents of the section 401 of the permission of printing 305 to a state before the authority about the electronic document is changed by the manager 301, i.e., contents shown in FIG. 3. Thus, according to the present exemplary embodiment, when wishing to temporarily permit printing of an electronic document, the manager 301 of the electronic document only needs to execute an operation of permitting printing of the electronic document as in the case of the document authority setting screen 400 shown in FIG. 4. In other words, the manager 301 needs to execute no operation after the operation of permitting printing of the electronic document as in the case of the document authority setting screen 400 shown in FIG. 4. After completion of the printing, the authority about the electronic document is automatically returned to the original state (state of printing inhibited) shown in FIG. 3.

The CPU 202 disposed in the printer 103 determines whether an abnormality has occurred to disable continuance of the printing during the printing of an electronic document, i.e., whether an abnormality has occurred to delete the print data of the electronic document during the printing. If a result of the determination shows the occurrence of an abnormality which causes a loss of the print data of the electronic document during the printing, the CPU 202 transmits abnormality occurrence information indicating the occurrence of the abnormality to the electronic document management server 101.

Figure 8:
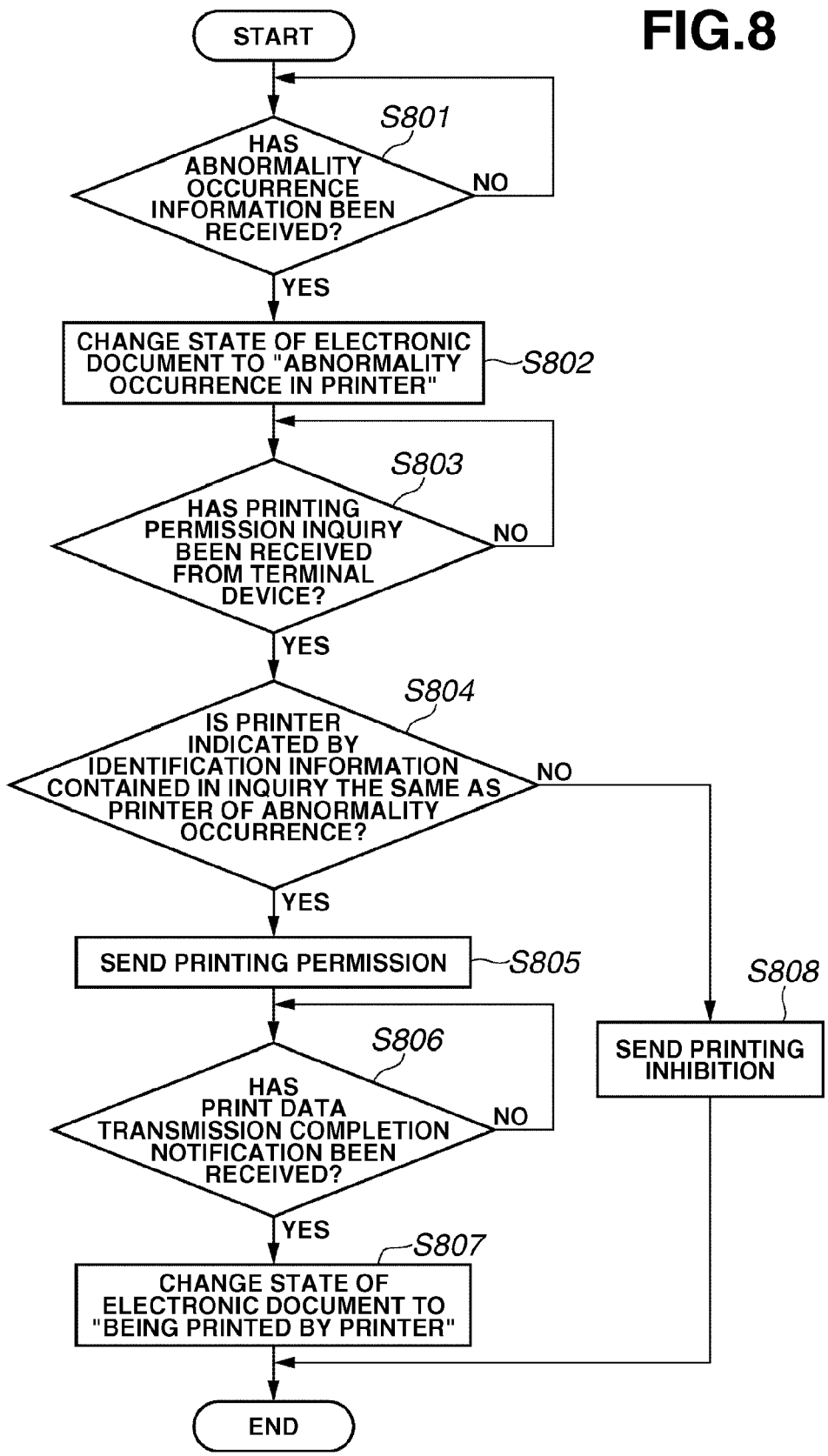
FIG. 8 is a flowchart showing an example of processing performed by the electronic document management server when an abnormality occurs in the printer during printing according to the first exemplary embodiment of the present invention.

Referring to the flowchart of FIG. 8, an example of processing performed by the electronic document management server 101 when an abnormality occurs in the printer 103 during printing will be described. The processing in the flowchart of FIG. 8 is realized when the CPU 210 of the electronic document management server 101 executes the electronic document management application or the like stored on the HDD 215.

First, the electronic document management server 101 determines whether abnormality occurrence information has been received from the printer 103 (step S801). According to the present exemplary embodiment, the printer 103 voluntarily transmits the abnormality occurrence information. However, the printer 103 may transmit the abnormality occurrence information in response to an inquiry from the electronic document management server 101.

FIG. 9 shows an example of a document authority setting screen 900 displayed when the electronic document management server 101 receives abnormality occurrence information. In the document authority setting screen 900 shown in FIG. 9, an abnormality occurs during printing of an electronic document of a document ID "00000001" by a printer 103 named "PRINTER A". In other words, the section 601 of the state of document 306 is changed from "BEING PRINTED (PRINTER A)" of FIG. 6 to "PRINTING ABNORMALITY (PRINTER A)" of FIG. 9. Accordingly, a state of the electronic document of the document ID "00000001" is set to an abnormal state.

Upon determination of reception of abnormality occurrence information in step S801, the electronic document management server 101 changes contents of the section 601 of the state of document 306 in the document authority setting screen 900 from "BEING PRINTED (PRINTER A)" to "PRINTING ABNORMALITY (PRINTER A)" (step S802).

In the printer 103, an abnormally has occurred to disable continuance of printing, and print data has been lost from the printer 103. Thus, after recovery from the abnormality in the printer 103, the CPU 210 disposed in the terminal 102 executes the printer driver based on a user's operation on the input device 213 to ask the electronic document management server 101 about printing permission of the electronic document again. As described above, for example, this inquiry is realized by transmitting identification information of a user, a document ID of an electronic document instructed to be printed, and identification information of the printer 103 which becomes a transmission destination of the print data of the electronic document to the electronic document management server 101.

To stand by until reception of such an inquiry, the electronic document management server 101 determines whether an inquiry about printing permission of the electronic document has been received (step S803). Next, based on identification information of the printer 103 contained in the inquiry, the electronic document management server 101 determines whether the printer indicated by the identification information is the same as that of the abnormality occurrence (step S804). If a result of the determination shows that the printer indicated by the identification information is the same as that of the abnormality occurrence, information indicating printing permission is sent to the terminal 102 which has made the inquiry (step S805).

Upon reception of the information indicating printing permission, the CPU 210 disposed in the terminal 102 executes the printer driver to generate print data of the electronic document, and transmits a print job containing the generated print data to the printer 103 again. Then, a transmission completion notification of the print data indicating completion of the print data to the printer 103 is transmitted to the electronic document management server 101.

To stand by until reception of such a transmission completion notification of print data, the electronic document management server 101 determines whether the transmission completion notification of the print data has been received (step S806). Upon reception of the transmission completion notification of the print data, the electronic document management server 101 changes contents of the section 601 of the state of document 306 to "being printed by the printer 103" in the document authority setting screen 900 (step S807).

If it is determined in step S804 that the printer indicated by the identification information is not the same as that of the abnormal occurrence, the electronic document management server 101 sends information indicating printing inhibition to the terminal 102 which has made the inquiry (step S808).

After execution of the aforementioned processing of FIG. 8, for example, the electronic document management server 101 executes processing similar to that of FIG. 7 (steps S703 and S704).

As shown in FIG. 8, when the printer 103 recovers after the abnormality occurs therein during printing, for printing requests of the same electronic document as that during the printing, printing requests alone to the recovered printer 103 are accepted. It is because when an abnormality occurs in the printer 103 during printing, problems generated especially when the abnormality occurs after some documents have been output must be solved. For example, if the electronic document is newly printed by a printer 103 different from the printer 103 recovering from the abnormality, there is a possibility that some paper sheets having been output by the printer 103 recovering from the abnormality will be neglected. Thus, if some paper sheets are neglected, information printed thereon may leak out. According to the present exemplary embodiment, as described above, by permitting printing only to the same printer 103 as that of the abnormality occurrence, dispersal of paper sheets output based on an electronic document to a plurality of printers 103 can be prevented.

As described above, according to the present exemplary embodiment, for example, when wising to permit temporary printing of the electronic document of the document ID "00000001" to the user named "Yamada", the manager 301 first operates the input device 213 disposed in the electronic document management server 101. Then, the manager 301 changes contents of the section 401 of the permission of printing 305 from "PRINTING INHIBITED" to "PRINTING PERMITTED" as in the case of the document authority setting screen 400 shown in FIG. 4 to permit printing of the electronic document of the document ID "00000001". Subsequently, upon reception of the printing completion notification indicating the printing completion of the electronic document from the printer 103, the electronic document management server 101 automatically returns the contents of the section 401 of the permission of printing 305 to the state before the authority about the electronic document is changed by the manager 301.

Thus, after execution of the operation of permitting printing of the electronic document as in the case of the document authority setting screen 400 shown in FIG. 4, the manager 301 does not need to perform any operations. Furthermore, the user does not need to report the printing completion to the manager 301. Accordingly, a use authority about an electronic document given to the specific user can be restored without losing convenience for the manager and the user of the electronic document, and inadvertent leakage of information unintended by the manager of the electronic document can be prevented.

Second Exemplary Embodiment

Next, a second exemplary embodiment of the present invention will be described. According to the present exemplary embodiment, the number of times of printing is added to items in a document authority setting screen so that a limitation of the number of times of printing of an electronic document is imposed on a user of the electronic document. Thus, the present exemplary embodiment is different from the first exemplary embodiment in that a limitation is imposed on printing of an electronic document based on the number of times of printing of the electronic document. Hence, in the present exemplary embodiment, components similar to those of the first exemplary embodiment will be denoted by the same reference numerals as in FIGS. 1 to 9 when necessary, and a detailed description thereof will be omitted.

FIG. 10 shows an example of a document authority setting screen 1000 displayed on a display 218 disposed in an electronic document management server 101. As in the case of the first exemplary embodiment, the document authority setting screen 1000 shown in FIG. 10 is displayed on the display 218 by executing an electronic document management application stored on a HDD 215 disposed in the electronic document management server 101.

As shown in FIG. 10, according to the present exemplary embodiment, in addition to permission of printing 305 of an electronic document, the number of times of printing 1001 of an electronic document can be set by the manager of the electronic document. FIG. 10 shows an example in which "2" is set as the number of times of printing 1001 of an electronic document of a document ID "00000001". In other words, for the electronic document of the document ID "00000001", printing is permitted to be performed twice.

As described below, according to the present exemplary embodiment, when an integer of "1" or greater is set as the number of times of printing 1001, in other words, when the number of times of printing is 1 or greater, the electronic document management server 101 determines that printing is permitted.

FIG. 11 shows an example of a document authority setting screen 1100 displayed when the electronic document management server 101 receives a transmission completion notification of print data transmitted from a terminal 102.

In the document authority setting screen 1100 of FIG. 11, by a printing execution instruction from a user named "Yamada", an electronic document of a document ID "00000001" is transmitted to a printer 103 named "PRINTER A". In other words, a section 1101 of a state of document 306 is changed to "BEING PRINTED (PRINTER A)". Accordingly, the state of the electronic document of the document ID "00000001" is changed to "being printed by the printer 103".

Figure 12:
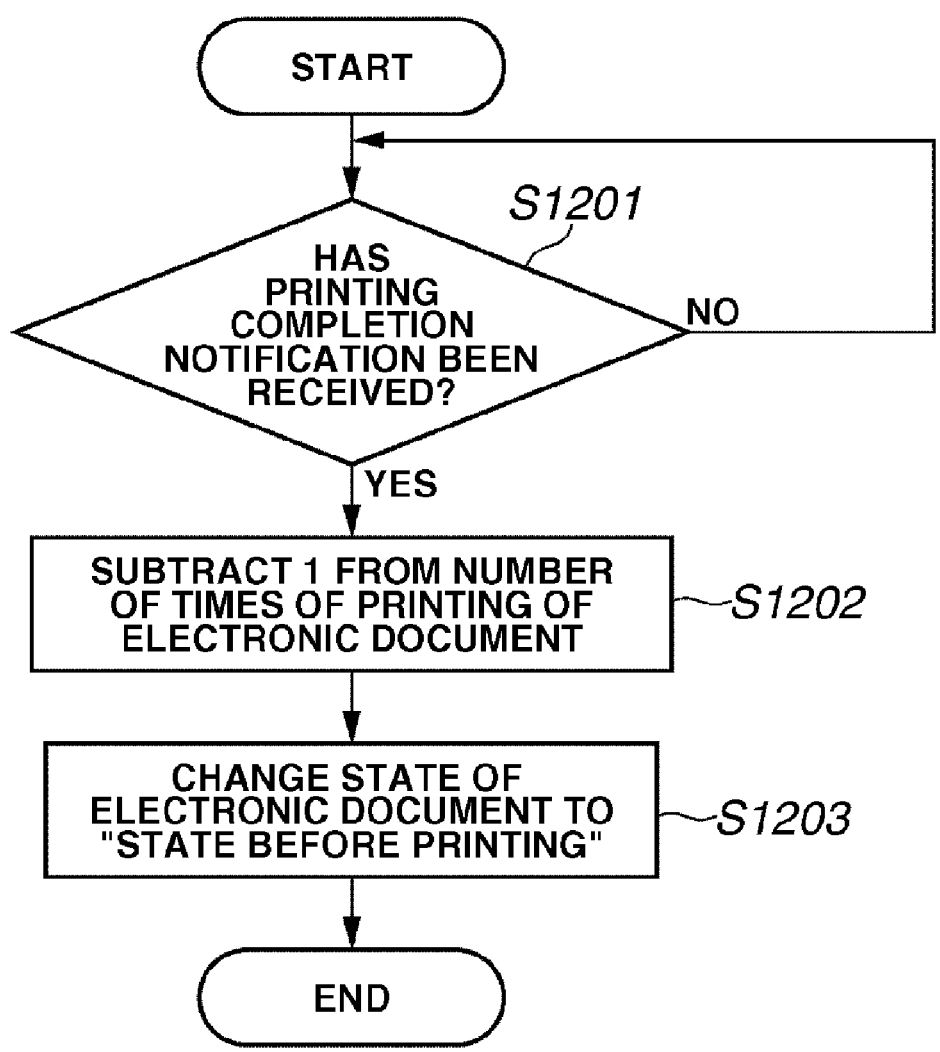
FIG. 12 is a flowchart showing an example of processing performed by the electronic document management server when a printing completion notification is transmitted from a printer according to the second exemplary embodiment of the present invention.

Next, referring to the flowchart of FIG. 12, an example of processing performed by the electronic document management server 101 when a printing completion notification is transmitted from the printer 103 will be described. The processing in the flowchart of FIG. 12 is realized when a CPU 210 of the electronic document management server 101 executes an electronic document management application or the like stored on the HDD 215.

First, to stand by until reception of a printing completion notification, the electronic document management server 101 determines whether the printing completion notification has been received (step S1201). Upon reception of the printing completion notification, as shown in FIG. 11, the electronic document management server 101 subtracts "1" from a numerical value of a section of the number of times of printing 1001 of the document authority setting screen 1100 (step S1202). Then, the electronic document management server 101 returns contents of a section 1101 of the state of document 306 to a state before printing ("SAVED") (step S1203).

FIG. 13 shows an example of a document authority setting screen 1300 displayed when printing of an electronic document is completed.

In the document authority setting screen 1300 shown in FIG. 13, a section 1301 of the state of document 306 is changed from "BEING PRINTED (PRINTER A)" shown in FIG. 11 to "SAVED", and a section 1301 of the number of times of printing 1001 is changed from "2" to "1". Accordingly, the number of times of printing of an electronic document of a document ID "00000001" is updated.

Figure 14:
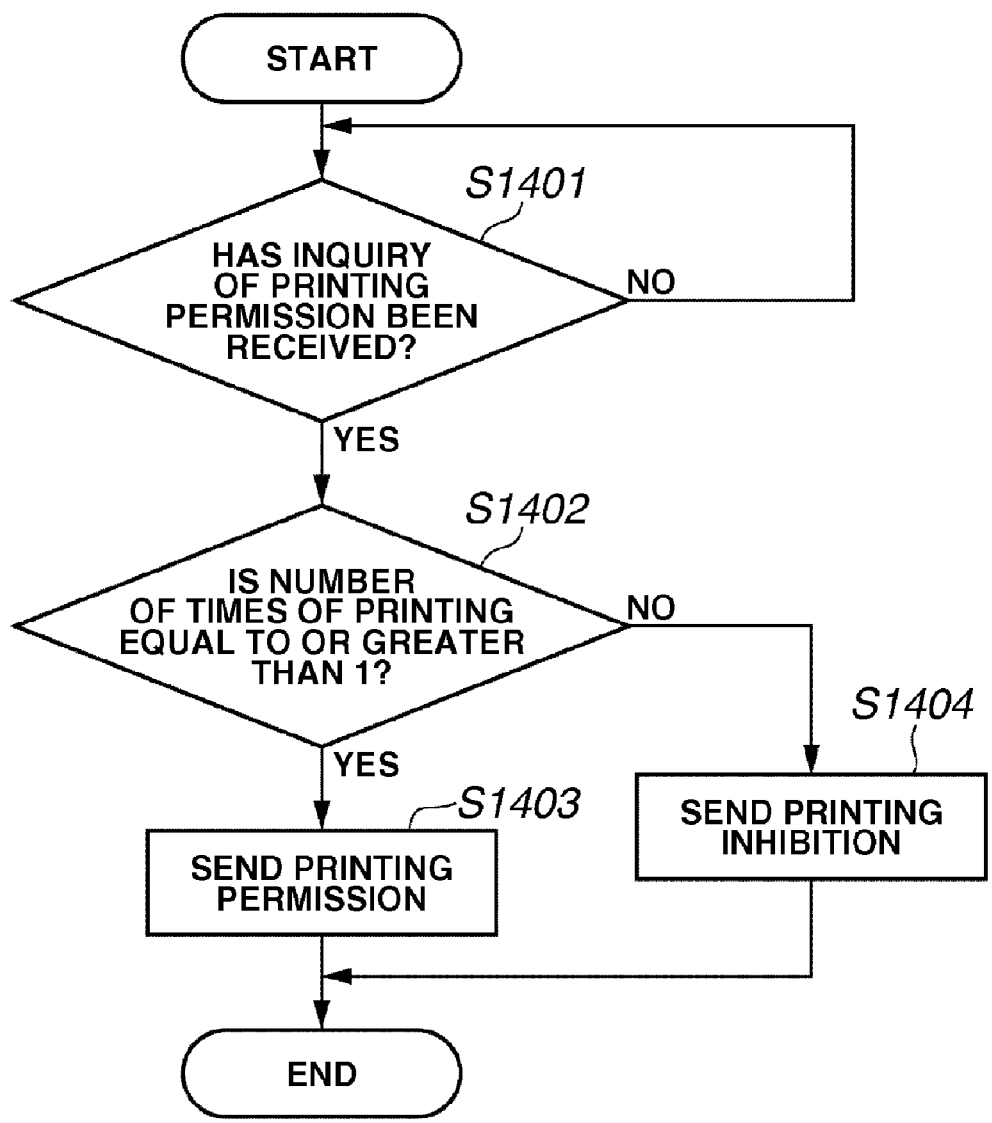
FIG. 14 is a flowchart showing an example of processing performed by the electronic document management server when an inquiry about permission of printing of an electronic document instructed to be subjected to printing execution is sent from a terminal apparatus according to the second exemplary embodiment of the present invention.

Next, referring to the flowchart of FIG. 14, an example of processing performed by the electronic document management server 101 when the terminal 102 makes an inquiry about printing permission of an electronic document instructed to be printed will be described. The processing in the flowchart of FIG. 14 is realized when the CPU 210 of the electronic document management server 101 executes an electronic document management application or the like stored on the HDD 215.

First, to stand by until reception of an inquiry about printing permission of an electronic document instructed to be printed, the electronic document management server 101 determines whether the inquiry has been received (step S1401) Then, based on contents set in the document authority setting screen, the electronic document management server 101 determines whether the number of times of printing of a relevant electronic document is equal to or greater than 1 (step S1402). If a result of the determination indicates that the number of times of printing of the relevant electronic document is equal to or greater than 1, the electronic document management server 101 sends information indicating printing permission to the terminal 102 which has made the inquiry (step S1403) to terminate the processing.

On the other hand, if the number of times of printing of the relevant electronic document is not equal to or greater than 1, the electronic document management server 101 sends information indicating printing inhibition to the terminal 102 which has made the inquiry (step S1404).

FIG. 15 shows an example of a document authority setting screen 1500 displayed when the number of times of printing of the electronic document of the document ID "00000001" reaches "0" as a result of repeating the processing in the flowchart of FIG. 12. As compared with FIG. 13, in the document authority setting screen 1500 shown in FIG. 15, a section 1301 of the number of times of printing 1001 is changed to "0", and a section 1501 of the permission of printing 305 is changed to "PRINTING INHIBITED". Accordingly, in the example of FIG. 15, the number of times of printing of the electronic document of the document ID "00000001" is automatically set to "0", and printing inhibition of the electronic document is automatically set.

As described above, according to the present exemplary embodiment, printing is permitted only for an electronic document whose number of times of printing is set to 1 or greater in the document authority setting screen. For the number of times of printing set in the document authority setting screen, "1" is subtracted each time a printing completion notification is transmitted from the printer 103. Thus, in addition to the effects of the first exemplary embodiment, an effect that the manager of an electronic document can permit plural times of printing of the electronic document to the user by setting the number of times of printing only once can be provided. Hence, it is possible to flexibly meet user's requests.

According to the present exemplary embodiment, the number of times of printing is managed. However, the number of prints may be managed in place of or in addition to the number of times of printing. In other words, the manager of an electronic document presets the number of pieces to be printable by using the document authority setting screen. Then, for each completion of printing of one or a plurality of pieces of an electronic document, a printing completion notification is transmitted from the printer 103 to the electronic document management server 101. The electronic document management server, when receiving the printing completion notification, subtracts the number of printed pieces from the set number of pieces to be printable. Thus, for example, when a plurality of pieces are printed while the number of times of printing is 1, it is possible to permit the preset number of pieces alone. In this case, an inquiry about printing permission from the terminal 102 to the electronic document management server 101 contains information indicating the number of prints. Only when the number of prints set in the document authority setting management screen is equal to or greater than the number of prints contained in the inquiry, information indicating printing permission is sent to the terminal 102 that has made the inquiry.

According to the first and second exemplary embodiments, when on-going printing of an electronic document is set by the electronic document management server 101, for an inquiry about printing permission of the electronic document, printing inhibition may always be sent to the terminal 102. In this way, it is possible to prevent simultaneous outputting of the print data to the other printer 103 during outputting of the print data to a certain printer 103, and to prevent outputting of a plurality of documents despite the intension of the manager of the electronic documents.

According to the first and second exemplary embodiments, the printer driver stored on the HDD 215 disposed in the terminal 102 is executed to make the inquiry about printing permission to the electronic document management server 101. However, this is not always necessary. For example, an inquiry may be made about printing permission by using a dedicated application for reading/editing an electronic document.

Furthermore, according to the first and second exemplary embodiments, the state of document is set to "being printed" based on the print data transmission completion notification. However, this is not always necessary. For example, the state of document may be set "being printed" by receiving a printing start notification indicating a printing start of the electronic document from the printer 103.

Third Exemplary Embodiment

Next, a third exemplary embodiment of the present invention will be described. According to the aforementioned first exemplary embodiment, the terminal 102 asks the electronic document management server 101 about permission of printing of an electronic document before transmission of print data of the electronic document (see FIG. 5). On the other hand, according to the present exemplary embodiment, a printer 103 that has received print data of an electronic document from a terminal 102 asks an electronic document management server 101 about permission of printing of the electronic document before printing is executed. Thus, the present exemplary embodiment and the first exemplary embodiment are different from each other in processing when making inquiries about permission of printing of an electronic document. Hence, in the present exemplary embodiment, components similar to those of the first exemplary embodiment are denoted by the same reference numerals as in FIGS. 1 to 9 when necessary, and a detailed description thereof will be omitted.

As described above, an application program executed by a CPU 210 disposed in the terminal 102 transmits a print job containing print data of an electronic document to the printer 103 using a file transmission communication protocol. In this case, identification information of a user and identification information of the electronic document are transmitted together with or contained in the print job to be transmitted.

Figure 16:
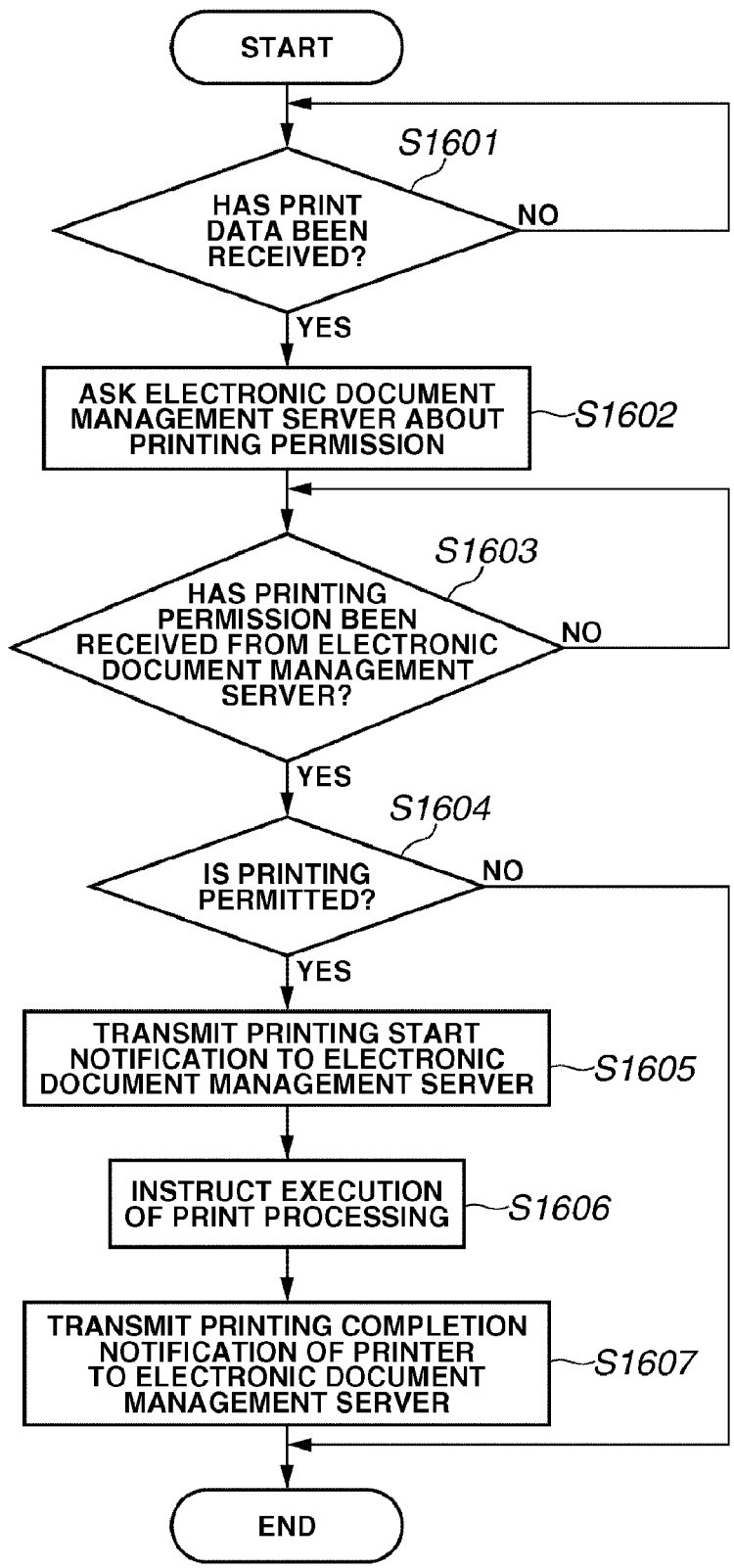
FIG. 16 is a flowchart showing an example of processing performed by a printer when a print job containing print data of an electronic document is transmitted from a terminal apparatus according to a third exemplary embodiment of the present invention.

Referring to the flowchart of FIG. 16, an example of processing performed by the printer 103 when a print job containing print data of an electronic document is transmitted from the terminal 102 will be described. The processing in FIG. 16 can be realized when a CPU 202 disposed in the printer 103 executes a program for executing printing.

First, to stand by until reception of a print job, the printer 103 determines whether the print job has been received (step S1601). Upon reception of the print job, the printer 103 asks the electronic document management server 101 about permission of printing of the electronic document (step S1602). Then, to stand by until reception of a response to the inquiry, the printer 103 determines whether the response has been received (step S1603). In step S1602, when making an inquiry about permission of printing of the electronic document, the printer 103 transmits identification information of a user and a document ID of the electronic document sent from the terminal 102 together with the print data of the electronic document as described above.

Upon reception of a response to the inquiry made in step S1602, the printer 103 determines permission/inhibition of printing by referring to the response (step S1604). If a result of the determination indicates inhibition of printing, the printer 103 cancels printing to terminate the processing.

On the other hand, if printing is permitted, the printer 103 transmits a notification indicating a start of printing of the electronic document (a printing start notification) to the electronic document management server 101 (step S1605).

Next, the printer 103 instructs a printer unit 201 to execute printing (step S1606). Accordingly, the electronic document is printed. After completion of printing of the electronic document, the printer 103 transmits a printing completion notification to the electronic document management server 101 (step S1607) to terminate the processing.

Processing from the reception of the printing start notification transmitted from the printer 103 to the reception of the printing completion notification transmitted from the printer 103 is similar to that of the flowchart of FIG. 7. However, the electronic document management server 101 receives the printing start notification of the print data in place of the transmission completion notification of the print data. Accordingly, by temporarily permitting printing of an electronic document, a manager of the electronic document can automatically return an authority about the electronic document to an original state, i.e., a state of printing inhibition, by the electronic document management server 101.

As in the case of the first exemplary embodiment, the CPU 202 disposed in the printer 103 determines an occurrence of an abnormality to disable continuance of printing of an electronic document during printing, i.e., an occurrence of an abnormality to lose print data of the electronic document during printing. If a result of the determination indicates that an abnormality has occurred to lose print data of the electronic document during printing, the CPU 202 transmits abnormality occurrence information indicating the occurrence of the abnormality to the electronic document management server 101.

Referring to the flowchart of FIG. 17, an example of processing performed by the electronic document management server 101 when an abnormality occurs in the printer 103 during printing will be described. The processing in the flowchart of FIG. 17 is realized when the CPU 210 of the electronic document management server 101 executes an electronic document management application or the like stored on the HDD 215.

First, to stand by until reception of abnormality occurrence information from the printer 103, the electronic document management server 101 determines whether the abnormality occurrence information has been received (step S1701). As in the case of the first exemplary embodiment (step S801 of FIG. 8), the printer 103 may transmit the abnormality occurrence information in response to an inquiry from the electronic document management server 101.

Upon reception of the abnormality occurrence information, as in the case of the first exemplary embodiment, the electronic document management server 101 changes contents of a section 601 of the state of document 306 from "BEING PRINTED (PRINTER A)" to "PRINTING ABNORMALITY (PRINTER A)" in the document authority setting screen 900 (step S1702).

In this case, in the printer 103, an abnormality has occurred to disable continuance of printing, and print data has been lost from the printer 103. Thus, after recovery from the abnormality of the printer 103, the CPU 210 disposed in the terminal 102 executes a printer driver based on a user's operation on an input device 213 to transmit print data of the electronic document to the printer 103. The printer 103 receives the print data and asks the electronic document management server 101 about permission of printing of the electronic document. As described above, for example, this inquiry is realized by transmitting identification information of the user, a document ID of an electronic document instructed to be executed, and identification information of the printer 103 which becomes a transmission destination of the print data of the electronic document to the electronic document management server 101.

To stand by until reception of such an inquiry, the electronic document management server 101 determines whether the inquiry has been received (step S1703).

Next, based on the identification information of the printer 103 contained in the received inquiry, the electronic document management server 101 determines whether the printer indicated by the identification number is the same as the printer of the abnormality occurrence (step S1704). If a result of the determination indicates that the printer indicated by the identification information is the same as the printer of the abnormality occurrence, the electronic document management server 101 sends information indicating permission of printing to the printer 103 that has made the inquiry (step S1705).

As described above, upon reception of the information indicating permission of printing, the CPU 202 disposed in the printer 103 transmits a printing start notification to the electronic document management server 101.

To stand by until reception of the printing start notification, the electronic document management server 101 determines whether the printing start notification has been received (step S1706). Then, the electronic document management server 101 changes contents of the section 601 of the state of document 306 to "being printed by the printer 103" in the document authority setting screen 900 (step S1707).

If the printer indicated by the identification information is not the same as the printer of the abnormality occurrence (NO in step S1704), the electronic document management server 101 sends information indicating inhibition of printing to the printer 103 that has made the inquiry (step S1708). After execution of the processing shown in FIG. 17, for example, the electronic document management server 101 executes processing similar to that of FIG. 7 (steps S703 and S704).

As described above, even when the printer 103 asks the electronic document management server 101 about permission of printing of an electronic document received from the terminal 102 before execution of the printing, similar effects as those of the first exemplary embodiment can be obtained.

According to the present exemplary embodiment, various modified examples similar to those of the first exemplary embodiment can be employed.

Fourth Exemplary Embodiment

Next, a fourth exemplary embodiment of the present invention will be described. According to the present exemplary embodiment, as in the case of the second exemplary embodiment, the number of times of printing is added to items of a document authority setting screen, and a limitation of the number of times of printing of an electronic document is imposed on a user of the electronic document. Moreover, as in the case of the third exemplary embodiment, a printer 103 that has received print data of the electronic document from a terminal 102 asks an electronic document management server 103 about permission of printing of the electronic document before execution of printing. Thus, the present exemplary embodiment and the second exemplary embodiment are different from each other in processing when making inquiries about permission of printing of an electronic document. Accordingly, in the present exemplary embodiment, components similar to those of the first to third exemplary embodiments are denoted by the same reference numerals as in FIGS. 1 to 17, and a detailed description thereof will be omitted.

As shown in FIG. 10, according to the present exemplary embodiment, as in the case of the second exemplary embodiment, in addition to permission of printing of an electronic document, the number of times of printing of an electronic document is set. The electronic document management server 101 determines that printing is permitted when the number of times of printing is 1 or greater.

When the electronic document management server 101 receives a printing start notification transmitted from the printer 103, a document authority setting screen becomes as shown in FIG. 11. Specifically, a section 1101 of the state of document 306 is changed to "BEING PRINTED (PRINTER A)" (e.g., steps S1605 of FIG. 16, and steps S1705 and S1706 of FIG. 17).

Upon completion of printing of the electronic document, the document authority setting screen becomes as shown in FIG. 13, and a section 1301 of the number of times of printing 1001 is changed from "2" to "1". Then, when the section 1301 of the number of times of printing 1001 becomes "0", as shown in FIG. 15, a section 1501 of the permission of printing 305 is changed to "PRINTING INHIBITED".

According to the present exemplary embodiment, as in the case of the third exemplary embodiment, the printer 103 that has received a print job asks the electronic document management server 101 about permission of printing.

If the number of times of printing set for the inquired electronic document is equal to or greater than 1, the electronic document management server 101 transmits information indicating permission of printing of the electronic document as a response to the inquiry to the printer 103. On the other hand, if the number of times of printing set for the inquired electronic document is not equal to or greater than 1, the electronic document management server 101 transmits information indicating inhibition of printing of the electronic document to the printer 103.

The printer 103 refers to such a response to the inquiry, and transmits a printing start notification to the electronic document management server 101 to execute printing if printing of the electronic documents is permitted. Upon completion of the printing, the printer 103 transmits a printing completion notification to the electronic document management server 101.

Processing by the electronic document management server 101 from reception of the printing start notification transmitted from the printer 103 to reception of the printing completion notification transmitted from the printer 103 is similar to that of the flowchart of FIG. 7. Moreover, processing by the electronic document management server 101 when an abnormality occurs in the printer 103 during printing is similar to that of FIG. 17.

As described above, according to the present exemplary embodiment, the printer 103 asks the electronic document management server 101 about permission of printing before execution of the printing, and the electronic document management server 101 determines whether printing of the electronic documents is permitted based on the number of times of printing. Even in this way, effects similar to those of the first and second exemplary embodiments can be obtained.

According to the present exemplary embodiment, as in the case of the second exemplary embodiment, the number of prints can be managed in place of or in addition to the number of times of printing. Furthermore, various modified examples of the first and second exemplary embodiments can be employed.

Other Exemplary Embodiments

To operate various devices so as to realize the functions of the exemplary embodiments, software program code for realizing the functions of the exemplary embodiments may be supplied to an apparatus connected to various devices or a computer in a system. An arrangement of operating various devices according to a program stored in the computer (CPU or MPU) of the system or the apparatus is also included within the present invention.

In this case, the software program code realizes the functions of the exemplary embodiments. The program code itself and a unit supplying the program code to the computer, e.g., a storage medium storing the program code, constitute the present invention. The storage medium storing the program code includes, for example, a flexible disk, a hard disk, an optical disk, a magneto-optical disk, a CD-ROM, a magnetic tape, a nonvolatile memory card, and a read-only memory (ROM).

The computer executes the supplied program code to realize the functions of the exemplary embodiments. When the program code realizes the functions of the exemplary embodiments by cooperatively working with an operating system or another application software operated in the computer, the program code is included in the exemplary embodiments of the present invention.

After the supplied program code is stored in a memory of a function expansion board of a computer, a CPU of the function expansion board executes a part or the whole of actual processing based on instructions of the program code. Realization of the functions of the exemplary embodiments by the processing is also included within the present invention.

The supplied program code is stored in a memory of a function expansion unit connected to a computer, and then a CPU or the like of the function expansion unit executes a part or the whole of actual processing based on instructions of the program code. Realization of the exemplary embodiments by the processing is also included within the present invention.

According to an exemplary embodiment of the present invention, when an electronic document is processed after the setting for inhibiting processing of the electronic document is changed to setting for permission, the setting for permitting processing of the electronic document is automatically returned to the original setting for inhibition. Hence, a manager of the electronic document can temporarily permit processing of the electronic document to a user without losing convenience of the manager and the user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-019509 filed Jan. 27, 2006, which is hereby incorporated by reference herein in its entirety.

What is claimed is:

1. An apparatus which is connectable to a document processing apparatus, comprising:

a storage unit configured to store policy information indicating a first setting for inhibiting processing of an electronic document by the document processing apparatus;

a first setting changing unit configured to change the first setting for inhibiting the processing of the electronic document by the document processing apparatus to a second setting for permitting the processing of the electronic document by the document processing apparatus;

a transmission unit configured to transmit, in response to a request for the policy information, the policy information indicating the second setting to a sender of the request;

a reception unit configured to receive, from the document processing apparatus, information indicating that the electronic document has been processed by the document processing apparatus; and a second setting changing unit configured to change the second setting for permitting the processing of the electronic document to the first setting for inhibiting the processing of the electronic document in response to the reception unit receiving the information indicating that the electronic document has been processed by the document processing apparatus, wherein the document processing apparatus comprises a printing apparatus.

2. The apparatus according to claim 1, further comprising:
a memory unit configured to store number information indicating number of permissible times of processing of the electronic document; and
a number changing unit configured to subtract from the number of permissible times of processing indicated by the number information stored in the memory unit in response to the reception unit receiving the information indicating that the electronic document has been processed,
wherein the second setting changing unit changes the second setting for permitting the processing of the electronic document to the first setting for inhibiting the processing of the electronic document according to the number of permissible times of processing indicated by the number information stored in the memory unit.

3. The apparatus according to claim 2, wherein the first setting changing unit changes the first setting for inhibiting the processing of the electronic document to the second setting for permitting the processing of the electronic document in a case where a numerical value of 1 or greater is input as the number of permissible times of processing of the electronic document, and wherein the second setting changing unit changes from the second setting for permitting the processing of the electronic document to the first setting for inhibiting the processing of the electronic document in a case where the number of permissible times of processing of the electronic document becomes 0 as a result of subtracting from the number of permissible times of processing of the electronic document by the changing unit.

4. The apparatus according to claim 1, further comprising:
a second reception unit configured to receive information regarding a processing state in the document processing apparatus; and
a state storage unit configured to store the information regarding the processing state received by the second reception unit,
wherein the transmission unit transmits the policy information indicating the second setting based on the information regarding the processing state in the document processing apparatus.

5. The apparatus according to claim 4, wherein the transmission unit transmits information indicating the second setting for permitting processing only in the document processing apparatus in which an abnormality occurs for the electronic document based on information regarding a processing state in the document processing apparatus is abnormal.

6. The apparatus according to claim 4, wherein the transmission unit transmits information indicating the first setting for inhibiting the processing of the electronic document based on information regarding a processing state in the document processing apparatus is on-going processing.

7. The apparatus according to claim 1,
wherein the processing of the electronic document includes printing of the electronic document.

8. A system comprising:
an information processing apparatus;
a document processing apparatus; and
a terminal apparatus,
wherein the information processing apparatus includes:
a storage unit configured to store policy information indicating a first setting for inhibiting processing of an electronic document by the document processing apparatus;
a first setting changing unit configured to change the first setting for inhibiting the processing of the electronic document by the document processing apparatus to a second setting for permitting the processing of the electronic document by the document processing apparatus;
a first transmission unit configured to transmit, to the terminal apparatus, the policy information indicating the second setting in response to a request for the policy information;
a first reception unit configured to receive, from the document processing apparatus, information indicating that the electronic document has been processed by the document processing apparatus; and
a second setting changing unit configured to change the second setting for permitting the processing of the electronic document to the first setting for inhibiting the processing of the electronic document in response to the first reception unit receiving the information indicating that the electronic document has been processed by the document processing apparatus,
wherein the terminal apparatus includes:
a second reception unit configured to receive the policy information indicating the second setting; and
a second transmission unit configured to transmit the electronic document to the document processing apparatus in a case where the policy information indicating the second setting is received by the second reception unit,
wherein the information processing apparatus comprises a server which is connectable to a network,
wherein the document processing apparatus comprises a printing apparatus which is connectable to the network, and
wherein the terminal apparatus comprises a client device which is connectable to the network.

9. A system comprising:
an information processing apparatus;
a document processing apparatus; and
a terminal apparatus,
wherein the information processing apparatus includes:
a storage unit configured to store policy information indicating a first setting for inhibiting processing of an electronic document by the document processing apparatus;
a first setting changing unit configured to change the first setting for inhibiting processing of the electronic document by the document processing apparatus to a second setting for permitting the processing of the electronic document by the document processing apparatus;
a first transmission unit configured to transmit, to the document processing apparatus, the policy information indicating the second setting in response to a request for the policy information;
a first reception unit configured to receive, from the document processing apparatus, information indicating that the electronic document has been processed by the document processing apparatus; and a second setting changing unit configured to change the second setting for permitting the processing of the electronic document to the first setting for inhibiting the processing of the electronic document in response to the first reception unit receiving the information indicating that the electronic document has been processed by the document processing apparatus, wherein the terminal apparatus includes a second transmission unit configured to transmit the electronic document to the document processing apparatus, and wherein the document processing apparatus includes:

a second reception unit configured to receive the electronic document transmitted from the terminal apparatus;

a third reception unit configured to receive the information indicating the second setting; and a processing unit configured to process the electronic document received by the second reception unit in a case where the information indicating the second setting is received by the third reception unit, wherein the information processing apparatus comprises a server which is connectable to a network, wherein the document processing apparatus comprises a printing apparatus which is connectable to the network, and wherein the terminal apparatus comprises a client device which is connectable to the network.

10. A method for managing setting for inhibiting or permitting processing of an electronic document by a document processing apparatus, the method comprising:

storing policy information indicating a first setting for inhibiting processing of the electronic document by the document processing apparatus;

changing the first setting for inhibiting processing of the electronic document by the document processing apparatus to a second setting for permitting the processing of the electronic document by the document processing apparatus;

transmitting, in response to a request for the policy information, the policy information indicating the second setting to a sender of the request;

receiving, from the document processing apparatus, information indicating that the electronic document has been processed by the document processing apparatus; and changing the second setting for permitting the processing of the electronic document to the first setting for inhibiting the processing of the electronic document in response to receiving the information indicating that the electronic document has been processed by the document processing apparatus, wherein the document processing apparatus comprises a printing apparatus.

11. The method according to claim 10, further comprising:

storing number information indicating number of permissible times of processing of the electronic document in a memory unit;

subtracting from the number of permissible times of processing indicated by the number information stored in the memory unit in response to receiving the information indicating that the electronic document has been processed; and changing the second setting for permitting the processing of the electronic document to the first setting for inhibiting the processing of the electronic document according to the number of permissible times of processing indicated by the information stored in the memory unit.

12. The method according to claim 11, further comprising:

changing the first setting for inhibiting the processing of the electronic document to the second setting for permitting the processing of the electronic document in a case where a numerical value of 1 or greater is input as the number of permissible times of processing of the electronic document; and changing from the second setting for permitting the processing of the electronic document to the first setting for inhibiting the processing of the electronic document in a case where the number of permissible times of processing of the electronic document becomes 0 as a result of subtracting from the number of permissible times of processing of the electronic document.

13. The method according to claim 10, further comprising:

receiving information regarding a processing state in the document processing apparatus;

storing the received information regarding the processing state; and transmitting the policy information indicating the second setting based on the information regarding the processing state in the document processing apparatus.

14. The method according to claim 13, further comprising transmitting the information indicating the second setting for permitting processing only in the document processing apparatus in which an abnormality occurs for the electronic document based on information regarding a processing state in the document processing apparatus is abnormal.

15. The method according to claim 13, further comprising transmitting information indicating the first setting for inhibiting the processing of the electronic document based on information regarding a processing state in the document processing apparatus is on-going processing.

16. The method according to claim 10, wherein the processing of the electronic document includes printing of the electronic document.

17. A computer-readable medium storing instructions which, when executed by an apparatus, causes the apparatus to perform operations comprising:

storing policy information indicating a first setting for inhibiting processing of an electronic document by the document processing apparatus;

changing the first setting for inhibiting processing of the electronic document by a document processing apparatus to the second setting for permitting the processing of the electronic document by the document processing apparatus;

transmitting, in response to a request for the policy information, the policy information indicating the second setting to a sender of the request;

receiving, from the document processing apparatus, information indicating that the electronic document has been processed by the document processing apparatus;

changing the second setting for permitting the processing of the electronic document to the first setting for inhibiting the processing of the electronic document in response to receiving the information indicating that the electronic document has been processed by the document processing apparatus, wherein the document processing apparatus comprises a printing apparatus.

* * * * *